March 9, 1937.  R. D. VAN RIPER  2,073,257
FOOD SLICING DEVICE
Filed April 30, 1935
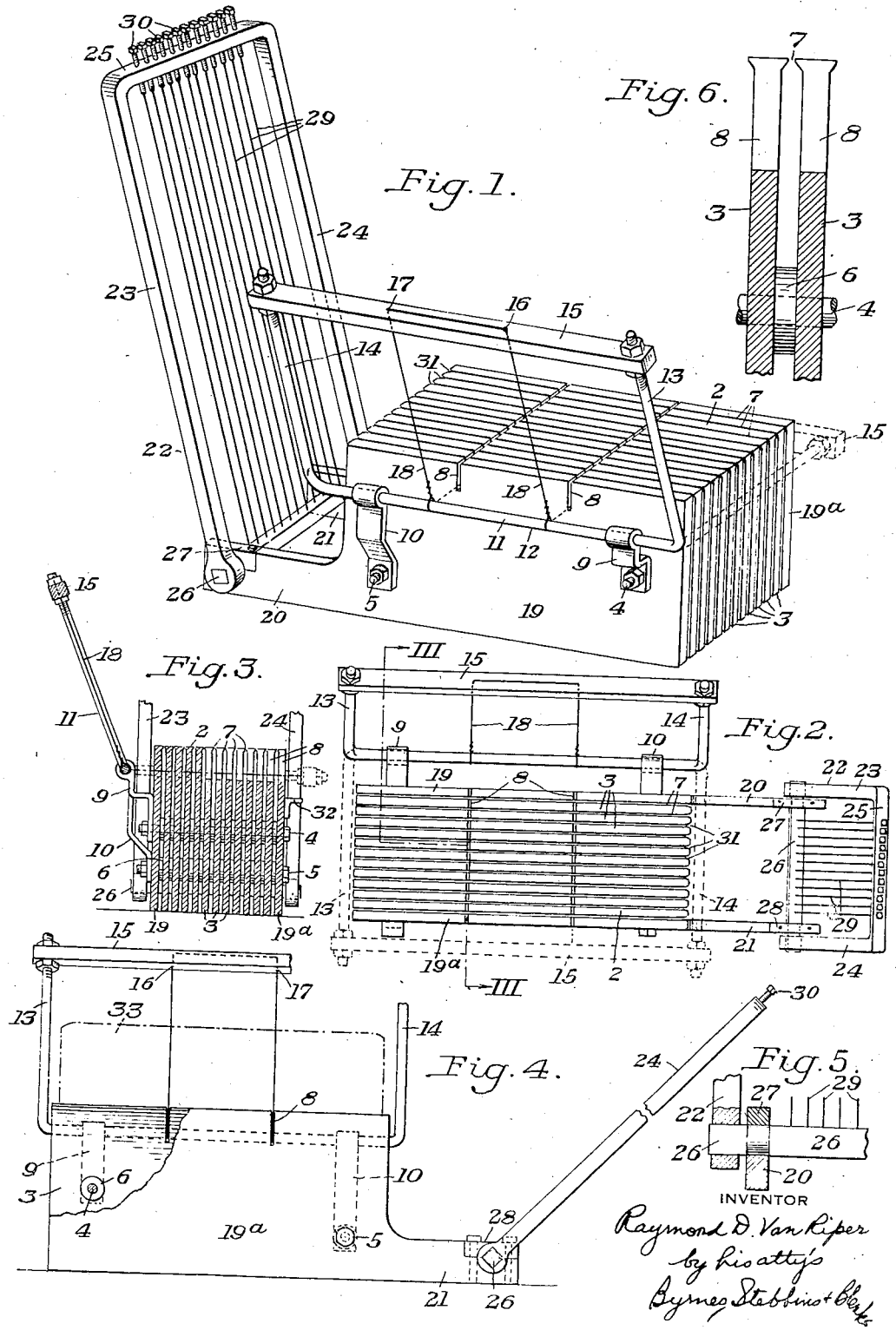
INVENTOR
Raymond D. Van Riper
by his atty's
Byrnes Stebbins & Co.

Patented Mar. 9, 1937

2,073,257

UNITED STATES PATENT OFFICE 2,073,257

FOOD SLICING DEVICE

Raymond D. Van Riper, Pittsburgh, Pa.

Application April 30, 1935, Serial No. 19,058

3 Claims. (Cl. 146—78)

My invention relates to the slicing or cutting of food products and is especially directed to a method and apparatus for slicing mush and similar food products which may be said to be in a plastic condition. The description herein will be specifically directed to apparatus and method suitable for cutting mush, although it will be understood that my invention is not confined to such products.

Mush is made from cornmeal, salt, and water which have been cooked to such a degree that it will retain its shape after it has cooled to room temperature. The hot mush may be readily poured into forming pans and left to cool and after the mush has sufficiently cooled a crust-like surface forms on the top of the pan where it is exposed to the air.

The cake of mush thus formed when removed from the pan is self-supporting and will retain its molded form. It is customary to mold the mush in pans which hold about six pounds of the product. A popular mush cake is of a size which weighs about two pounds and consequently the six pound mold or cake is cut into three blocks. It has been found that it is commercially desirable to slice the mush into relatively thin slices of a suitable size for further cooking by the purchaser.

The texture of the product is such that heretofore considerable difficulty has been experienced in satisfactorily cutting the cake into blocks and the blocks into slices. This difficulty is increased by the air-dried crust on one surface of the molded product, which crust is somewhat brittle and hard to sever by a clean cut. The present invention provides a method and apparatus peculiarly suitable for the purpose of cutting mush or products of like texture in such manner that the operation can be performed rapidly and without mutilation or injury to the product, so that the appearance of the sliced product is attractive. The apparatus is comparatively simple and inexpensive to construct and operate. The mechanism is reliable and accurate in operation so that the sliced blocks of mush produced thereby are uniform as to size and appearance and when wrapped will hold their size and shape.

In the accompanying drawing, I have shown for purposes of illustration only, one embodiment of the preferred apparatus, it being understood that the drawing does not define the limits of my invention and that changes in the construction and operation therein disclosed may be made without departing from the spirit of my invention.

In describing my invention in detail, reference will be had to the accompanying drawing wherein like characters denote like or corresponding parts throughout the several views, in which:

Figure 1 is a perspective view of suitable apparatus;

Figure 2 is a plan view of the apparatus;

Figure 3 is a cross-sectional view along the lines III—III of Figure 2;

Figure 4 is a view in elevation, partly broken away to show the features of the construction;

Figure 5 is a view partly in section of one of the details of the apparatus; and Figure 6 is a view on an enlarged scale of a further detail of the invention.

Referring to the drawing, numeral 2 denotes a grooved cutting bed or support which is made up of a number of rigid plates 3 arranged side by side and fastened together by bolts 4 and 5. The plates are preferably of a modified T-shape as shown in Figure 6, the top of the T-portion forming the top of the support. The plates 3 are spaced apart by spacing blocks or washers 6 so that between adjoining plates is an aperture or slot. Due to the shape of the plates, each slot or aperture 7 is of narrow width, say $\frac{1}{16}$th of an inch, at the top. At suitable intervals, shallow slots or recesses 8 are cut into the plates across the top and transverse thereto. The plates when assembled form a support or table or cutting bed having slots running longitudinally of it and slots or recesses running transversely of it. The longitudinal slots, except for the washer and bolt areas, extend completely through the support. Secured to one side of the apparatus are brackets 9 and 10 which may be conveniently held in place by the bolts 4 and 5 which hold the plates together. Secured in the brackets 9 and 10 so as to be readily rotatable therein is a cutting frame 11 having a cross-bar 12 and arms 13 and 14 extending at right angles to the cross-bar. The arms 13 and 14 pass through a cross-bar 15 in which are suitably placed holes 16 and 17. One end of a cutting wire 18 is secured to bar 12 and is threaded through holes 16 and 17 in bar 15 and back to part 12. The ends of the wire may be secured to bar 12 by any suitable means such as by twisting the ends. The necessary tension on these small cutting wires is secured by adjusting the position of bar 15 on arms 13 and 14 by means of the threaded ends and nuts shown on arms 13 and 14. The cutting wire 18, when the frame 11 is moved to the position shown in dotted lines in Figure 1, pass through the slots or recesses 8. The two side plates 19 and 19a have extended portions 20 and 21 which serve to support a second cutting frame 22 having two longitudinal arms 23, 24, and a cross or end bar 25. The ends of arms 23 and 24 are fastened to a cross-bar 26 which cross-bar is journaled in the extended portions 20 and 21, and are retained in position by bearing caps 27 and 28. A detail of these connections is shown in Figure 5. Between the cross-bars 25 and 26 a plurality of cutting wires 29 extend. These wires are fastened to bar 26 in any suitable manner and are fastened to screws 30 in end bar 25. By adjusting the screws 30, the desired tension may be imparted to the cutting wires 29. The wires are spaced apart the same distance as the spacing of the grooves 7 in the support so that when frame 22 is moved clockwise, wires 29 register with and pass through slots 7. In order to facilitate the entrance of these wires into the slots, the ends of the plates adjacent frame 23 are chamfered as shown at 31 in Figures 1 and 2.

In order to prevent cutting wires 29 from coming in contact with bolts 4 and 5 and possibly injuring the cutting wires, bracket 9 is placed at an elevation such that arm 23 will be prevented from movement beyond the desired point. It is, of course, understood that in operation the cutting arm 23, as shown in Figure 1, is moved clockwise from the position shown to a position limited by bracket 9. In order that no undesirable strain will be imparted to arm 23 on the side opposite to bracket 9, a small bracket 32 is placed so as to contact arm 24 at the same time that arm 23 is contacting bracket 9. For satisfactory operation, it is essential that cutting frame 22 makes a considerable angle with the horizontal when the cutting wires initially contact the material to be sliced.

In operating my apparatus, cutting frames 11 and 22 are placed in position shown in Figure 1. A cake of mush 33 which may be of approximately the same surface area as the top of the support 2, is placed thereon and with the crust side in contact with the top of the support. Frame 11 is moved in a clockwise direction completely through cake 33 to the position shown in dotted lines in Figure 1, and is then returned to its original position, as shown in full lines in Figure 1. The cutting frame 22 is then moved in a clockwise position (Figure 1) to the position where arms 23 are stopped by brackets 9 and 32. The operation of cutting frame 11 cuts the mush into three blocks and the subsequent operation of cutting frame 22 cuts each block into the desired number of slices of a predetermined thickness. The frame 11 is operated and then swung back out of the way before the frame 22 is operated. After the frame 22 is operated and each block divided into relatively thin slices, the sliced product is removed from the cutting bed before the frame 22 is returned to its original position. The importance of this operation is that when the frame 11 is moved back bringing the cutting wires back through the mush, the mush remains in large blocks which are not disturbed by the return passage of the cutting wires; whereas, after the blocks are divided into relatively thin slices, the return movement of the cutting wires would mutilate and break the individual slices, thereby marring the appearance of the finished product. Also, by laying the crust surface of the mush against the bed of the machine, the crust is firmly held by the rigid bed; whereas, if the loaf were left with the crust-side up, the body of mush under the crust will yield, causing the crust to chip and break.

By the use of this apparatus, and by the method I have described, I am able to cut the mush into predetermined sizes of blocks and each block into a predetermined number of slices in an expeditious manner and in such a fashion that the blocks can be readily handled and wrapped. By the use of the apparatus shown, I cut the mold of mush into three blocks and each block into thirteen slices, although any desired number of blocks and slices could be readily cut by the use of similar apparatus. It is usual to wrap each block separately into a salable unit. The block can be handled readily and shows absolutely no disposition to become distorted as the adjacent slices adhere quite firmly enough for handling and yet the consumer can very readily separate the slices, and it will be found that since there is no permanent adherence whatsoever between adjacent slices that the slices are clean cut and attractive.

I have illustrated and described, by way of example, apparatus suitable for carrying out my process according to my invention. It will be understood that the invention is not limited to such forms as I have described, but it may be otherwise embodied within the scope of the following claims.

I claim:

1. A slicing device for slicing a cake of mush into a plurality of transverse and longitudinal rows of relatively long and thin slices, comprising an open top cutting bed having a plurality of closely spaced and deep longitudinal slots, there also being a plurality of shallow widely spaced transverse slots in the bed, a transverse cutting frame pivoted at the side of the bed slightly below the top of the bed, a cutting wire for each transverse slot in the bed connected to the transverse cutting frame, and a longitudinal cutting frame pivoted at the front end of the bed below the axis of the transverse frame and having a cutting wire for each longitudinal slot in the bed connected thereto, the vertical distance between the pivotal axes of the two frames being considerably greater than the vertical distance from the top of the bed to the pivotal axis of the transverse frame, whereby the wires of the longitudinal frame are at a considerable angle to the face of the bed as the wires leave the mush at the rear end of the cake.

2. A slicing device for slicing a cake of mush into a plurality of transverse and longitudinal rows of relatively long and thin slices, comprising an open top cutting bed having a plurality of closely spaced and deep slots, there also being a plurality of shallow transversely spaced slots in the bed, a transverse cutting frame, said cutting frame having a cross-bar pivoted at the side of and slightly below the top of the bed, arms extending outwardly from the cross-bar, a second cross-bar mounted on the end portions of the arms, a cutting wire for each transverse slot in the bed connected to the cross-bars, means for adjusting the said second cross-bar relative to the first cross-bar for tensioning the cutting wires, and a longitudinal cutting frame pivoted at the front end of the bed below the axis of the transverse frame and having a cutting wire for each longitudinal slot in the bed connected thereto, the vertical distance between the pivotal axes of the two frames being considerably greater than the vertical distance from the top of the bed to the pivotal axis of the transverse frame, whereby the wires of the longitudinal frame are at a considerable angle to the face of the bed as the wires leave the mush at the rear end of the cake.

3. A slicing device for slicing a cake of mush into a plurality of transverse and longitudinal rows of relatively long and thin slices, comprising a bed built up of a plurality of laterally spaced parallel plates, T-shaped in cross section, with the wide portions thereof in alignment and forming the top of the bed with narrow longitudinal slots between the plates, spacers between the plates, bolts passing through the plates and spacers for securing the plates to each other, there being registering transverse slots in the upper portions of the plates, a transverse cutting frame pivoted at the side of the bed, a cutting wire for each transverse slot connected to the frame, a longitudinal cutting frame pivoted at the end of the frame, and a cutting wire for each longitudinal slot between the T-shaped plates.

RAYMOND D. VAN RIPER.